United States Patent
Urquidi et al.

(10) Patent No.: US 7,360,756 B2
(45) Date of Patent: Apr. 22, 2008

(54) VIBRATION ISOLATING BUSHING WITH EMBEDDED SPEED/POSITION SENSOR

(75) Inventors: Carlos A. Urquidi, Chihuahua (MX); Hector H. Rodriguez, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/267,977

(22) Filed: Nov. 7, 2005

(65) Prior Publication Data

US 2006/0220330 A1    Oct. 5, 2006

Related U.S. Application Data

(63) Continuation-in-part of application No. 11/096,253, filed on Mar. 31, 2005, and a continuation-in-part of application No. 11/095,765, filed on Mar. 31, 2005.

(51) Int. Cl.
*B60G 11/22* (2006.01)

(52) U.S. Cl. .................. 267/293; 267/140.14; 267/281

(58) Field of Classification Search ........... 267/140.14, 267/140.15, 292–294, 279–282; 280/5.514, 280/6.157

See application file for complete search history.

(56) References Cited

U.S. PATENT DOCUMENTS

| | | | |
|---|---|---|---|
| 3,060,370 A | 10/1962 | Varterasian | |
| 3,510,143 A | 5/1970 | Carpenter | 280/6 |
| 3,751,061 A | 8/1973 | Scheuerpflug | 280/96.2 R |
| 3,779,581 A | 12/1973 | Scheuerpflug | 280/95 R |
| 4,168,840 A | 9/1979 | Graham | 280/6 R |
| 4,319,236 A | 3/1982 | Brace et al. | 340/679 |
| 4,349,735 A | 9/1982 | Maeda | 260/229 |
| 4,624,477 A | 11/1986 | Kumagai et al. | 280/707 |
| 4,642,496 A | 2/1987 | Kerviel et al. | 310/68 B |
| 4,667,943 A | 5/1987 | Izumi et al. | 267/141.3 |
| 4,706,988 A | 11/1987 | Young | 280/676 |
| 4,756,374 A | 7/1988 | Bailey et al. | 177/137 |
| 4,838,563 A | 6/1989 | Konishi et al. | 280/840 |
| 4,858,899 A | 8/1989 | Saotome et al. | 267/219 |
| 4,961,650 A | 10/1990 | Schwarzbich | 384/49 |
| 5,016,903 A * | 5/1991 | Kijima et al. | 280/124.134 |
| 5,024,283 A * | 6/1991 | Deli | 180/89.14 |
| 5,031,934 A | 7/1991 | Soltis | 280/840 |
| 5,246,248 A * | 9/1993 | Ferguson | 280/5.524 |
| 5,253,735 A | 10/1993 | Larson et al. | 188/1.11 |
| 5,261,748 A | 11/1993 | Kameda | 384/222 |

(Continued)

FOREIGN PATENT DOCUMENTS

CA    2 482 121    3/2003

(Continued)

OTHER PUBLICATIONS

W. Beitz, H.Küttner: "Dubbel, Taschenbuch für den Maschinenbau, 17, Auflage", 1990, Springer verlag, Berlin. XP002388450, p. W11, Paragraph 2.4.4.

(Continued)

*Primary Examiner*—Chris Schwartz
(74) *Attorney, Agent, or Firm*—Paul L. Marshall

(57) ABSTRACT

A bushing assembly adapted for application in vehicle suspension systems includes an embedded position sensor and an embedded speed sensor.

19 Claims, 5 Drawing Sheets

U.S. PATENT DOCUMENTS

| | | | |
|---|---|---|---|
| 5,497,081 A | 3/1996 | Wolf et al. | 324/207.12 |
| 5,573,263 A | 11/1996 | Denny et al. | 280/509 |
| 5,692,587 A * | 12/1997 | Fratini, Jr. | 188/266.2 |
| 5,814,999 A | 9/1998 | Elie et al. | |
| 5,922,953 A | 7/1999 | Payne et al. | 73/494 |
| 5,999,868 A * | 12/1999 | Beno et al. | 701/37 |
| 6,126,177 A | 10/2000 | Steinert | 280/5.5 |
| 6,181,997 B1 | 1/2001 | Badenoch et al. | 701/37 |
| 6,219,602 B1 | 4/2001 | Badenoch et al. | 701/37 |
| 6,232,771 B1 | 5/2001 | Herden et al. | 324/207.25 |
| 6,293,511 B1 | 9/2001 | Shepherd | 248/441.1 |
| 6,370,458 B1 | 4/2002 | Shal et al. | |
| 6,397,134 B1 | 5/2002 | Shal et al. | |
| 6,446,993 B1 | 9/2002 | Huszarik et al. | 280/124.177 |
| 6,465,607 B2 | 10/2002 | Taguchi et al. | 528/480 |
| 6,489,761 B1 | 12/2002 | Schroeder et al. | 324/207.25 |
| 6,566,864 B1 | 5/2003 | Brown et al. | 324/207.2 |
| 6,614,223 B2 | 9/2003 | Schroeder et al. | 324/207.22 |
| 6,668,222 B2 | 12/2003 | Shal et al. | 701/37 |
| 6,766,239 B2 | 7/2004 | Barron et al. | 701/71 |
| 6,777,928 B2 | 8/2004 | Ramirez | 324/207.25 |
| 6,866,127 B2 | 3/2005 | Nehl | 188/267 |
| 2003/0011358 A1* | 1/2003 | Karpinski | 324/173 |
| 2003/0107163 A1 | 6/2003 | Asano et al. | 267/140.12 |
| 2003/0137291 A1 | 7/2003 | Wendel et al. | |
| 2004/0162654 A1* | 8/2004 | Lu et al. | 701/38 |
| 2004/0190805 A1* | 9/2004 | Ersoy et al. | 384/448 |
| 2004/0199313 A1* | 10/2004 | Dellinger | 701/37 |
| 2004/0201196 A1 | 10/2004 | Katagiri et al. | 280/124.134 |

FOREIGN PATENT DOCUMENTS

| | | |
|---|---|---|
| DE | 100 14 980 | 4/2001 |
| DE | 10255234 * | 6/2004 |
| FR | 2 858 673 | 11/2005 |
| GB | 2143328 A | 2/1985 |
| JP | 4-20812 | 1/1992 |
| WO | 00/59746 | 10/2000 |
| WO | 00/59747 | 10/2000 |

OTHER PUBLICATIONS

European Search Report dated Jun. 30, 2006.
European Search Report dated Jul. 4, 2006.

* cited by examiner

VIBRATION ISOLATING BUSHING WITH EMBEDDED SPEED/POSITION SENSOR

This application is a continuation-in-part of and claims priority from U.S. patent applications Ser. Nos. 11/096,253 and 11/095,765, both filed Mar. 31, 2005 and both incorporated herein by reference.

I. FIELD OF THE INVENTION

The present invention relates generally to position and/or speed sensors for measuring positions and/or velocities of various components, particularly stability control components, in vehicles.

II. BACKGROUND OF THE INVENTION

The above-referenced patent applications disclose a position sensor that is embedded in a suspension bushing assembly (such as the lower control arm bushing assembly) of a vehicle to serve as a feedback-sensing device for a control loop for one or more vehicle control systems. Such systems may include, e.g., antilock braking systems (ABS) and stability control systems that can, among other things, dynamically adjust the stiffness of shock absorbers to fit driving and road conditions.

As recognized herein, not only can such systems advantageously use signals representing the positions of various components, e.g., the position of a suspension control arm relative to the vehicle chassis, but also the speed at which a component moves, e.g., the speed at which the control arm is moving relative to the chassis. As further recognized herein, while the signal from a position sensor can be differentiated with respect to time to yield speed, the resulting processed signal may undesirably include noise and further may lack phase information, both of which can detract from the usefulness of the speed signal. With these recognitions in mind, the present invention is provided.

SUMMARY OF THE INVENTION

A bushing assembly includes an outer member, an inner member arranged substantially concentrically with the outer member, and an elastomeric member disposed between and interconnecting the inner and outer members. A speed sensor is at least partially embedded within the elastomeric member and produces an output signal that indicates the relative speed between the inner and outer members. In other words, the output signal from the speed sensor represents a relative speed between the members without having to differentiate the signal with respect to time.

In non-limiting embodiments one of the members is established by a stator assembly and the other of the members is established by a rotor assembly. The stator assembly can include at least first and second opposed radially tapered stator poles and the rotor assembly likewise can include at least first and second radially inwardly extending tapered rotor poles.

A magnet may be on the first member or the second member, and a galvanomagnetic sensing element also may be on the first member or the second member. An air gap is established between the members which varies dimensionally as a function of the relative angular position of the members. The preferred speed sensor is contactless, and may be implemented by a coil. In one implementation the stator assembly is on the first member and the first member is an inner member. The rotor is on the second member, and the second member surrounds the first member.

In another aspect, a speed sensing system includes a bushing assembly that includes a moving part, a non-moving part, and an elastomeric material therebetween. A sensor is disposed at least partially in the elastomeric material for generating a signal that represents relative position between the parts, or relative speed between the parts. Means are provided for receiving the signal for outputting a speed signal representing relative speed between the parts.

In a less preferred embodiment, the sensor is a position sensor and the means for outputting includes an electronic circuit differentiating the signal with respect to time to generate the speed signal. In a more preferred embodiment, the sensor is a speed sensor and the means for outputting consequently need not include an electronic circuit differentiating the signal with respect to time. The moving part can be a rotor and the non-moving part can be a stator surrounded by the rotor. In an exemplary application the bushing assembly is engaged with a lower control arm of a vehicle suspension, and the speed signal is used by a control system to establish a stiffness of a shock absorber in the vehicle.

In yet another aspect, a bushing assembly for a vehicle includes a stator engageable with a reference part of a vehicle, and a rotor engageable with a moving part of the vehicle. The assembly also includes a resilient material disposed between the stator and rotor. A speed sensor is engaged with the rotor or the stator for outputting a signal that is directly proportional to the relative speed between the rotor and stator without having to differentiate the signal with respect to time.

The speed sensor may be a coil wound around a portion of the stator, an a magnet can be mounted on the stator. In non-limiting implementations the stator may define one or more stator pole faces and the rotor may define one or more rotor pole faces, and the pole faces are configured to establish an output of the coil sensor that varies substantially linearly with the relative speed between the rotor and stator. A position sensor such as a Hall effect sensor may also be on the rotor or the stator.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

The present invention is intended for application in automotive vehicle suspension systems and will be described in that context. It is to be understood, however, that the present invention could also be successfully applied in many other applications.

The non-limiting embodiment of the present invention serves as both a bushing for mounting suspension system components to an automotive vehicle as well as a speed (and in some implementations a position) sensor to monitor the speed between selected suspension components while the vehicle is in operation.

Figure 1:
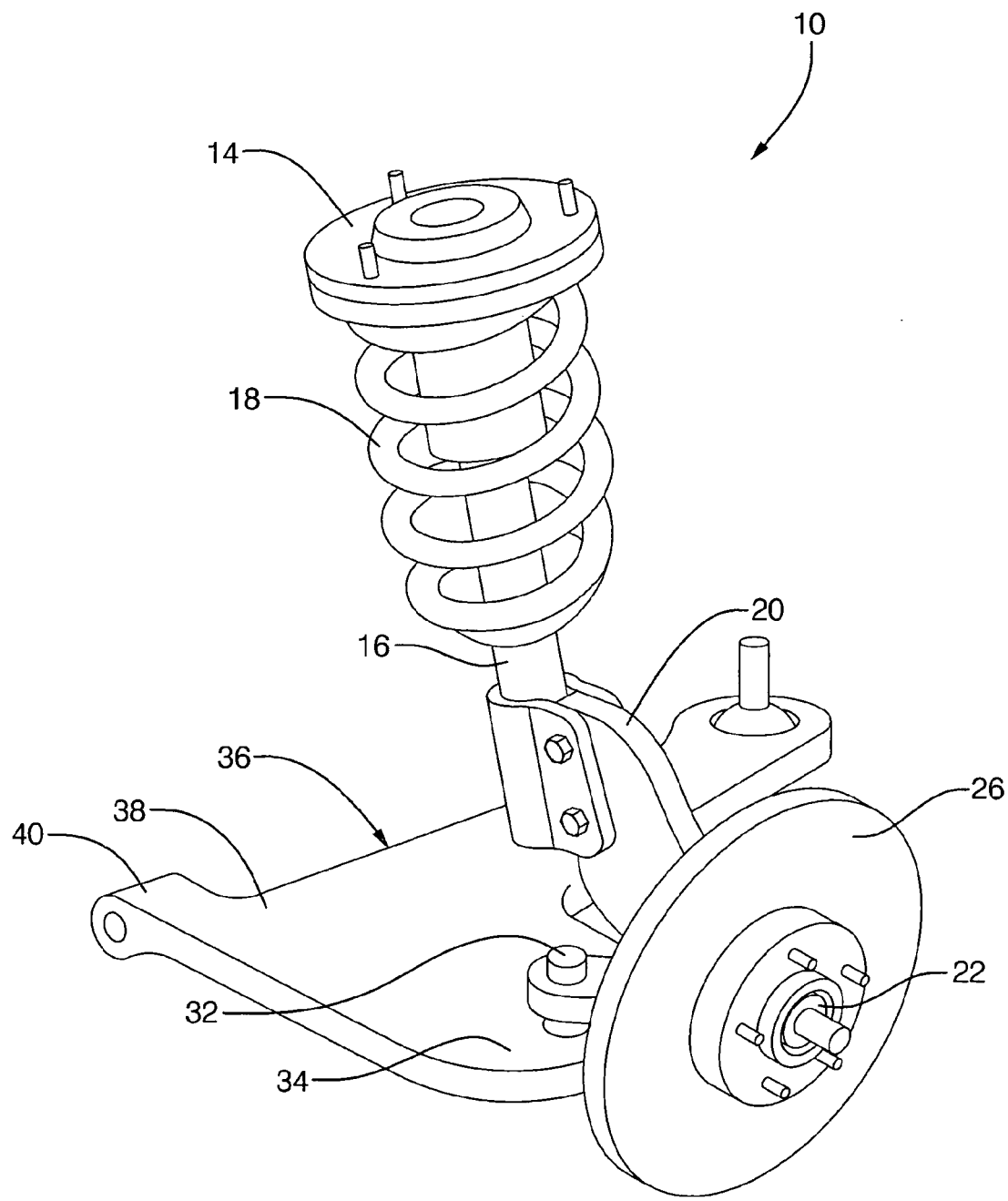
FIG. 1 is a perspective view of an automotive front suspension system in which the present invention can be applied.
Figure 2:
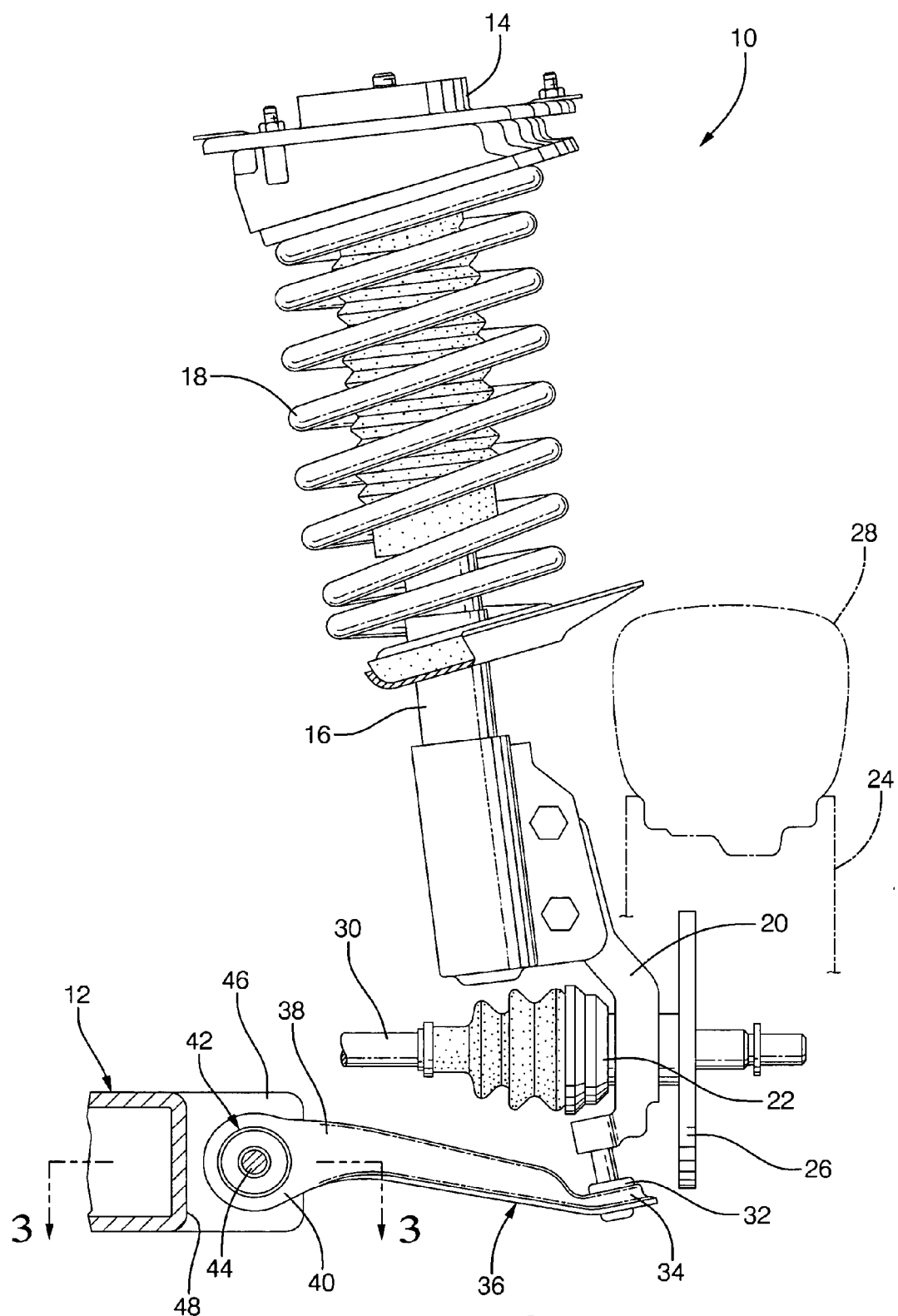
FIG. 2 is a front plan view, on an enlarged scale, of the suspension system of FIG. 1 with its point of interface with a mating vehicle body illustrated in broken away cross-section taken on lines 3-3 from FIG. 3.

Referring to FIGS. 1 and 2 for an illustration of a non-limiting implementation of the present invention, an automotive vehicle front wheel drive front suspension assembly 10 includes a shock tower (not illustrated) formed of sheet metal that is rigidly connected to the frame 12 of the host vehicle. Mounted to the shock tower is a strut tower cap 14 which, in turn, is mounted to a McPherson strut 16. The McPherson strut 16 is surrounded by a spring 18.

At its lower end, the McPherson strut 16 is connected to a knuckle assembly 20. The knuckle assembly 20 has rotatively mounted therein a hub/bearing unit 22. The vehicle wheel 24 (in phantom) is connected to the hub/bearing unit 22. A brake rotor 26 is disposed between the hub 22 and the wheel 24. A pneumatic tire 28 (in phantom) is mounted to the vehicle wheel 24 and is rotatively powered by a half-shaft 30, which is rotated by the transaxle (not illustrated), which is typical of many front wheel drive vehicles.

The lower end of the knuckle assembly 20 is mounted for multi-axis pivotal movement upon a ball joint 32. The ball joint 32 is mounted on a lateral arm 34 of a lower control arm assembly 36. The lower control arm assembly 36 has a front arm 38 with a horizontally extending cylindrical end 40. Cylindrical end 40 mounts a lower control arm front bushing 42 that receives a horizontal pin 44. The horizontal pin 44 connects the lower control arm front arm 38 with a front pivot bracket 46 rigidly fixed to the frame 12. When in the assembled position, cylindrical end 40 is captured within a pocket 48 defined by bracket 46. The lower control arm 36 is also pivotally connected with a sway shaft (not illustrated) to control vehicle roll during cornering maneuvers.

As best depicted in FIG. 2, frame 12 and bracket 46 constitute a first structural member, which is substantially fixed with respect to the host automotive vehicle. Control arm assembly 36, including front arm 38 and horizontally extending cylindrical end 40, constitute a second structural member which is displaceable with respect to frame 12. As illustrated, control arm assembly 36 is joined to the frame 12 by bushing 42 for limited relative rotation about an axis defined by horizontal pin 44.

Figure 3:
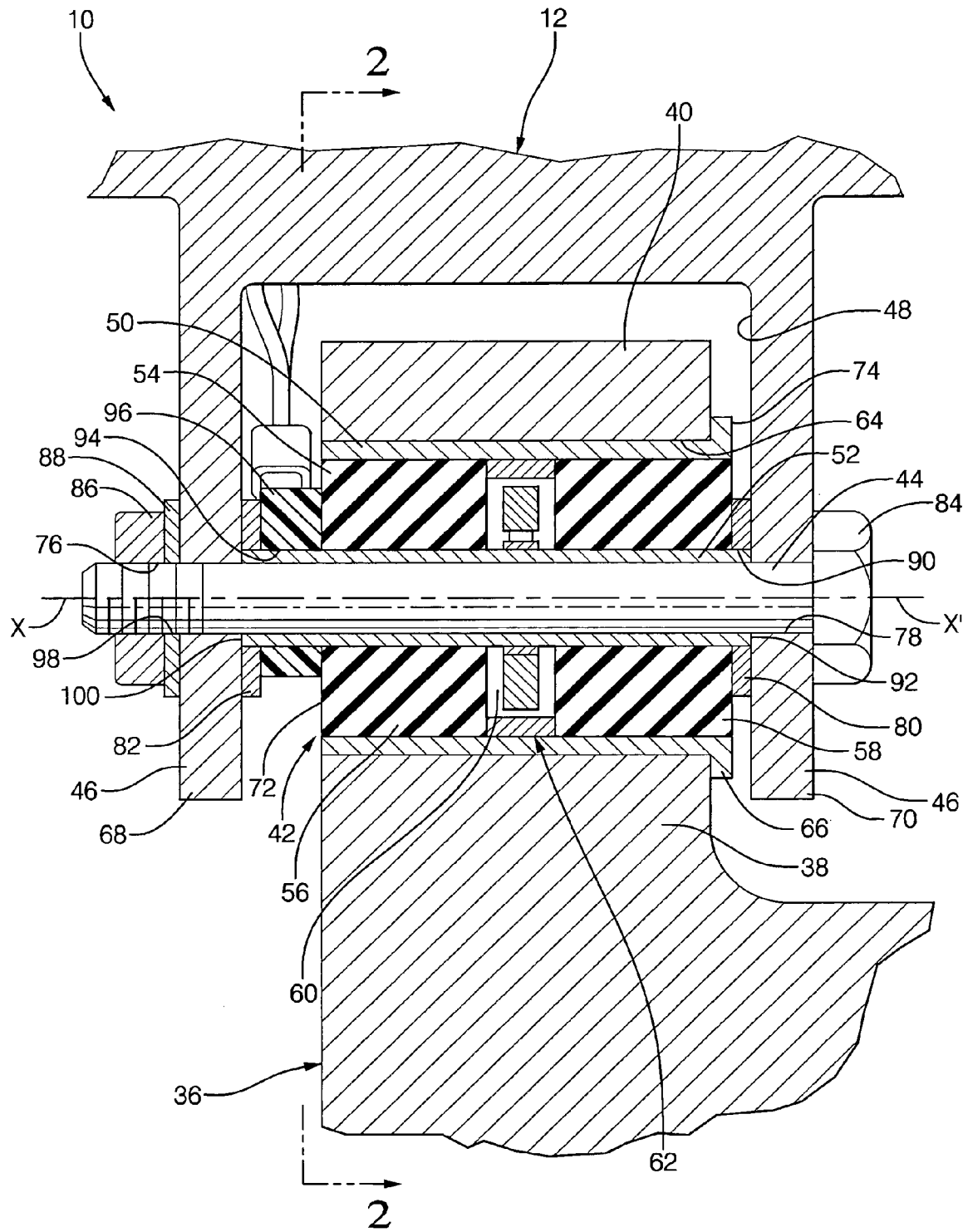
FIG. 3 is a broken away portion, on a still enlarged scale, of the vehicle body-suspension interface taken on lines 2-2 from FIG. 2.

Due to the extreme structural complexity of a typical modern automobile suspension systems, FIGS. 1, 2 and 3 have been significantly simplified to eliminate unnecessary detail for the sake of clarity. Further elaboration on this point can be gleaned from existing patent literature. For example, U.S. Pat. No. 6,446,993 to Huszarik et al. describes automotive vehicle front wheel suspension assemblies in detail and is incorporated herein by reference.

Referring to FIG. 3, the bushing 42 is illustrated in application with the surrounding structure of the control arm assembly 36 and vehicle frame 12. The bushing 42 serves, in combination with the horizontal pin 44, to join the control arm assembly 36 to the vehicle frame 12 so as to permit limited relative rotation there between about an axis X-X' defined by pin 44 while preventing significant axial, radial and rotational displacement there between.

The bushing 42 is an assembly comprising a cylindrical external metal member or bushing tube 50, a cylindrical internal metal member or bushing tube 52 disposed concentrically with the external bushing tube 50 and an intermediate elastomeric member 54 disposed concentrically with the external and internal bushing tubes, 50 and 52, respectively. Elastomeric member 54 is preferably former of hard natural or synthetic rubber and is bifurcated into left and right half-portions, 56 and 58, respectively, axially spaced to form a closed cavity 60 there between.

An angular position sensor assembly 62 is nestingly disposed within closed cavity 60. The structure and function of position sensor assembly 62 will be described in detail herein below.

The position sensor assembly 62 can be assembled in its illustrated configuration within the bushing assembly 42 along with elastomer half-portions 56 and 58, which have been pre-molded and subsequently bonded to the inner diameter surface of the external bushing tube 50 and outer diameter surface of the internal bushing tube 52. Alternatively, elastomeric member 54 can be molded in place to simultaneously encapsulate the position sensor 62 and resiliently bond external and internal bushing tubes 50 and 52, respectively.

Although the external and internal bushing tubes are permanently interconnected by elastomeric member 54, its natural resiliency permits limited relative displacement there between when opposing forces are applied to external and internal bushing tubes 50 and 52, respectively. When such opposing forces are removed, the bushing tubes 50 and 52 will be resiliently urged back to their original positions.

In one non-limiting application, as illustrated in FIG. 3, the external bushing tube 50 of the bushing assembly 42 is affixed to control arm assembly 36 by press fitting the outer diameter surface of the external bushing tube 50 within a through bore 64 in the cylindrical end 40 of the front arm 38 of the control arm assembly 36. Such press interfit constitutes engagement means, which fixedly secures the external bushing tube 50 of bushing assembly 42 for movement with the control arm assembly. Alternatively, means to index the external bushing tube 50 with the cylindrical end 40 of front arm 38 could also assure such affixation.

One end of external bushing tube 50 forms a radially outwardly extending flange 66 which serves as a stop to precisely axial position the bushing 42 within bore 64.

Spaced, generally parallel ears 68 and 70 of bracket 48 straddle the left and right axial ends, 72 and 74, respectively, of bushing assembly 42. Through bores 76 and 78 formed in bracket ears 68 and 70, respectively, are concentrically aligned with axis X-X'. Pin 44, which is illustrated as a through bolt extends through bracket ear 70, a first spacer 80, the inner diameter passage formed by internal bushing tube 52, a second spacer 82 and bracket ear 68. Pin 44 is retained in its illustrated position by a head 84 at one end and a threaded nut 86 and washer 88 at the opposite end.

As viewed in FIG. 3, internal bushing tube 52 extends rightwardly through an enlarged center bore 90 in spacer 80. The right end surface 92 of internal bushing tube 52 abuts the adjacent facing wall of bracket ear 70. Furthermore, the internal bushing tube 52 extends leftwardly through a through bore 94 formed in an electrical connector assembly 96, the function of which will be described herein below, and an enlarged center bore 98 of spacer 82. The left end surface 100 of internal bushing tube 52 abuts the adjacent facing wall of bracket ear 68.

When installed as illustrated in FIG. 3, the internal bushing tube 52 and the pin 44 are fixedly attached to the host vehicle body via the frame 12 and pivot bracket 46 and will not move, even upon limited rotation of the control arm assembly 36 and external bushing tube. This is accomplished by the clamping of the ends 92 and 100 of the internal bushing tube 52 by the ears 68 and 70 of bracket 46 combined with a press fit of pin 44 within through bores 76 and 78 and internal bushing tube 52.

Thus assembled, the instantaneous relative angular position and speed between the control arm assembly 36 and vehicle frame 12 corresponds to the relative angular position and speed between the external and internal bushing tubes 50 and 52, respectively, of the bushing assembly 42.

In addition to serving to mount and support the control arm assembly 36 and related sprung vehicle suspension components, the bushing assembly 42 provides vibration damping and isolation to improve the drivability of the host automotive vehicle. This aspect of its functioning is well described in the patent literature. For example, U.S. Pat. No. 6,465,607 to Taguchi et al. and U.S. Patent Application Publication U.S. 2003/0107163 to Asano et al. describe design criteria for elastomeric bushing elements for passenger vehicle suspensions.

Figure 4:
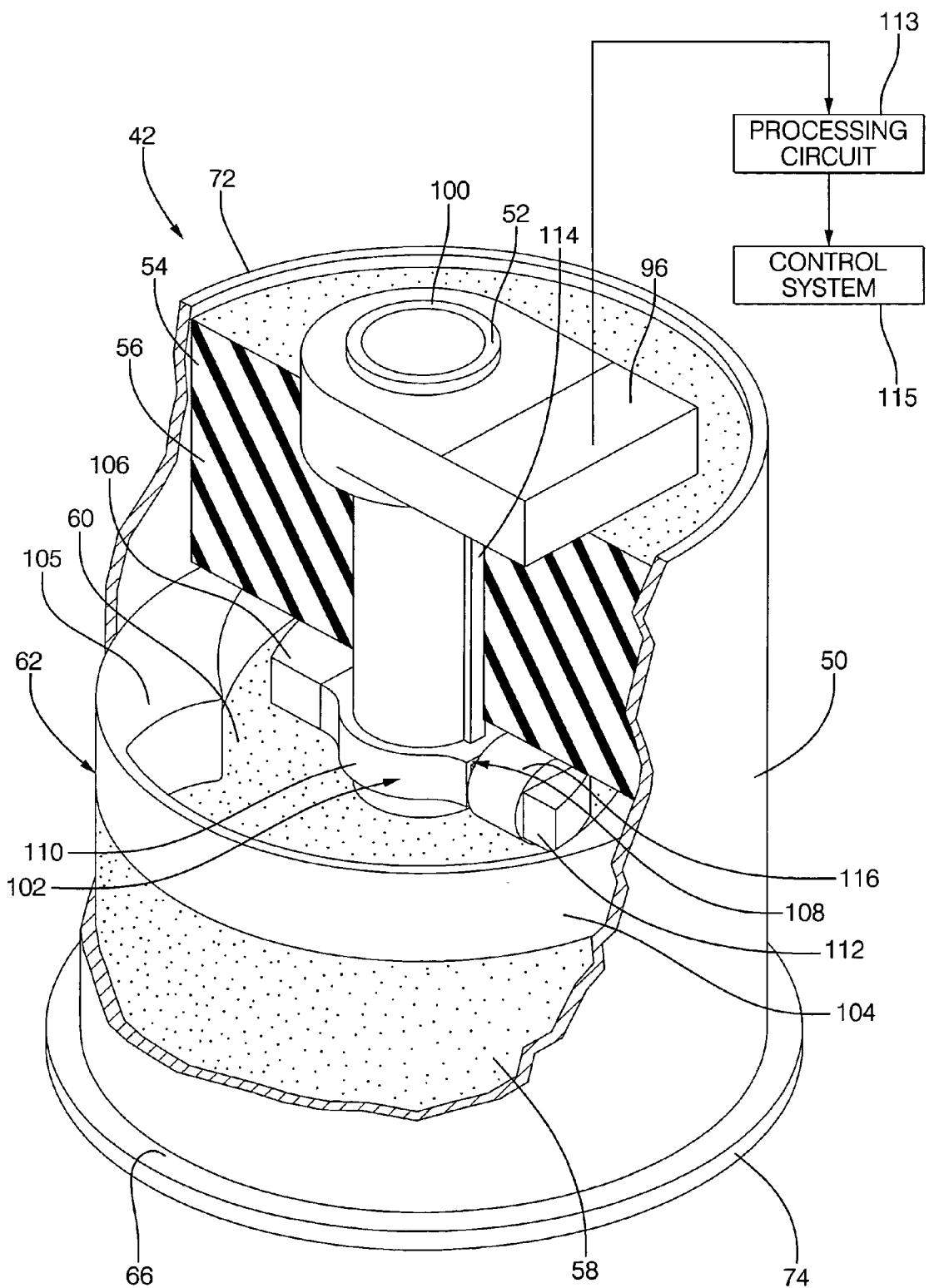
FIG. 4 is a cut-away perspective view of a bushing with embedded sensor assembly representing a non-limiting embodiment of the present invention, schematically showing a processing circuit and control system.
Figure 5:
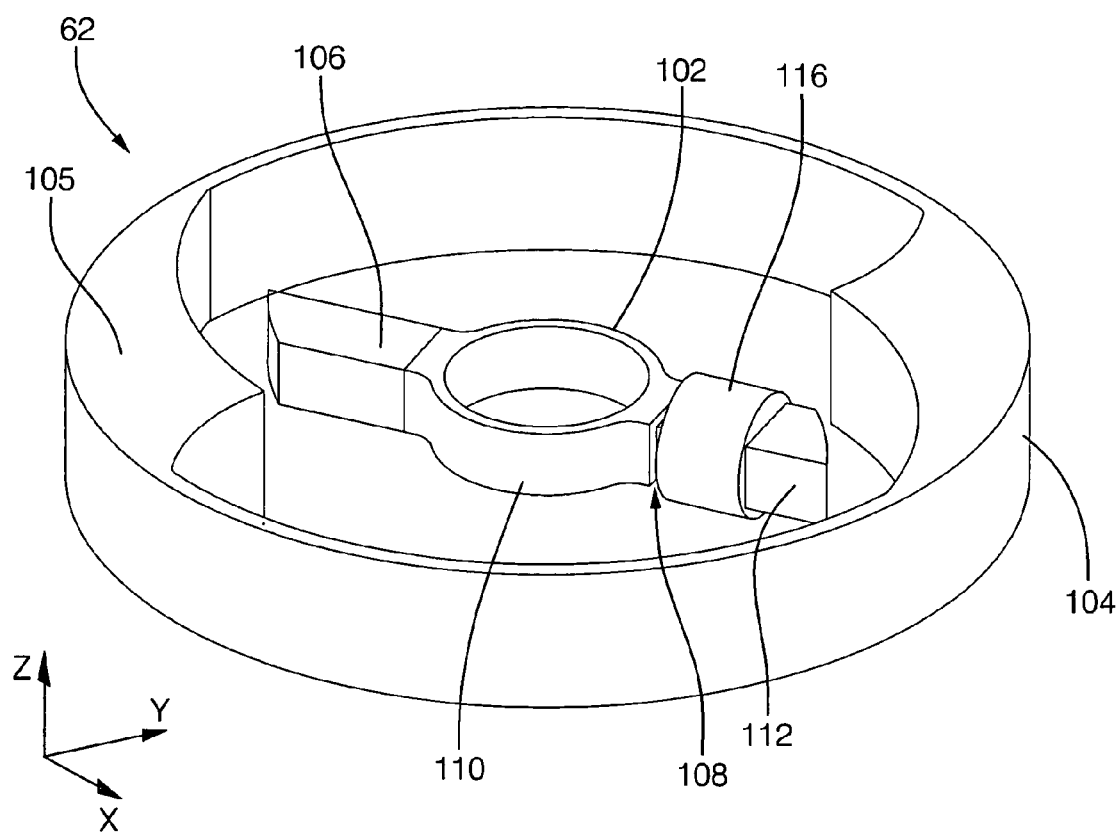
FIG. 5 is a perspective view of the sensor assembly of the present invention taken from the bushing/sensor assembly of FIG. 4, showing for convenience a Cartesian reference.

Referring now to FIGS. 4 and 5, a preferred non-limiting structure and operation of the sensor assembly 62 is illustrated. The sensor assembly 62 includes an armature or stator assembly 102 and a rotor ring 104. It is to be understood that the stator assembly 102 is mounted to the outer surface of the internal bushing tube 52 within the pocket 60 and that it extends radially outwardly therefrom. On the other hand, the rotor ring 104 is mounted to the inner surface of the external bushing tube 50 concentrically with the stator assembly 102 and extends radially inwardly therefrom. The rotor ring 104 may define a tapered rotor flux guide 105. It will be appreciated that the stator assembly 102 will remain relatively stationary with respect to the vehicle frame 12, while the rotor ring 104 will move with the control arm assembly 36.

If desired, the sensor assembly 62 can be hermetically sealed within the sealed pocket 60 that is within the bushing assembly 42.

The stator assembly 102 can include a permanent magnet 106, a galvanomagnetic position sensing element 108 such as but not limited to a Hall effect sensor, a first flux guide element 110, and a second flux guide element 112. The stator flux guide elements 110, 112 may be constructed of magnetically conductive material. The galvanomagnetic sensing element 108 is electrically in-circuit with a processing circuit 113 via a connection route 114 that is "dressed" externally adjacent the internal bushing tube 52 and that interconnects the sensing element 108 with the electrical connector assembly 96. Because the connection route 114 passes through the left half-portion 56 of the elastomeric member 54, it maintains the hermetic seal of the pocket 60. The processing circuit 113 can send position and/or speed signals to a vehicle control system 115, such as a shock absorber stiffness adjustment system or more generically a vehicle stability control system.

The above-referenced patent applications describe how the galvanomagnetic sensing element 108 in cooperation with the magnet 106 and flux guides 105, 110, 112 generates a signal representative of the position of the rotor 104 relative to the stator 102 for output thereof through the connector assembly 96 to a control system. As understood herein, an indication of the speed of this relative motion may also be required, and while in less-preferred embodiments the processing circuit 113 may to this end differentiate the position signal with respect to time, in the preferred embodiment shown in FIGS. 4 and 5 a speed sensor 116 is provided in the sensor assembly 62. By "speed sensor" is meant, broadly, any sensor that provides an electrical signal that represents a relative speed without having to differentiate the signal with respect to time. In the embodiment shown, the speed sensor is a coil of wire wound around the flux guide 112 and connected to the processing circuit 113 through the connector assembly 96. Alternatively, the coil could be wound around the magnet 106, or it could be wound around a portion of the rotor ring 104.

Referring specifically to FIG. 5, in the Cartesian coordinate system shown, the X axis corresponds with the line of elongation of the sensor stator assembly 102, the Z axis corresponds with the axis of revolution of the bushing assembly 42 and pin 44, and the Y axis is normal to both axes X and Z and passes through the intersection thereof.

As shown, the stator assembly 102 forms a generally elongated structure with the basic components series connected. The first stator flux guide element 110 is generally in the form of an annular ring, defining a central through passage 116 and radially outwardly facing opposed parallel flat arms aligned normally to the line of elongation. The permanent magnet 106 is bonded to one arm of the stator with its magnetic poles ordered parallel to the line of elongation (which is aligned along the x-axis in FIG. 5). As shown, the radially outer end of the magnet 106 is radially tapered and is curvilinear in shape to define a first stator pole face.

The galvanomagnatic position sensing element 108 is also bonded to the opposite arm of the stator 102, i.e., opposite the magnet 106 from the annular flux guide 105, with its sensing planes aligned normally to the line of elongation of the stator assembly 102. A second flux guide element 112 is, in turn, bonded to the galvanomagnetic position sensing element. The second flux guide element 112 extends radially outwardly, ending in a radially tapered and curvilinear shape to define a second stator pole face. The stator pole faces are preferably identical in surface area, shape and radial displacement. The galvanomagnetic position sensing element 108 is preferably a Hall effect sensor. However, it could be a magnetoresistive or other suitable sensor type.

With this structure, the stator assembly 102 can be carried in the internal bushing tube 52 that extends through the central passage 116 with a press interfit or bonding to ensure robust interconnection.

FIG. 5 also shows that the rotor ring 104 can be formed as a solid, substantially annular ring of magnetically conductive material defining two similar radially thickened circumferentially opposed generally crescent-shaped poles 105. The poles 105 define first and second tapered and curvilinear rotor pole faces as shown, each of which faces the stator.

In any case, when the speed sensor 116 is a coil, it can be wound around either one of the arms of the stator. The speed sensor 116 generates a voltage signal representing the speed of rotation of the rotor 104 with respect to the stator 102, because as the rotor 104 moves, owing to the above-described combination of structure the magnetic flux through the sensor 116 changes. The flux guide shapes described above are preferred, facilitating, as they do, a near-linear correlation of sensor 116 voltage to rotational speed. Accordingly, the output voltage of the speed sensor 116 is substantially proportional to the angular speed of the rotor 104 relative to the stator 102.

Modifications and variations of the embodiments herein are possible in light of the above teachings. For example, although the angular position assembly 62 is preferably centered axially within external bushing tube 50, it could be located offset towards one axial end thereof and, if desired, partially exposed to the environment to facilitate servicing or electrical connection access. Furthermore, the number of cooperating stator and rotor pole sets can be varied from one to a number greater that two.

Also, if a larger velocity signal is required, two coils can be used, one wound around, e.g., the magnet 106 and one wound around the flux guide 112, and the coils can be connected together in series.

It is, therefore, to be understood that while the particular VIBRATION ISOLATING BUSHING WITH EMBEDDED SPEED/POSITION SENSOR as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A bushing assembly comprising:
   an outer member;
   an inner member arranged substantially concentrically with the outer member;
   an elastomeric member disposed between and interconnecting the inner and outer members; and
   a sensor assembly at least partially embedded within the elastomeric member intermediate said inner and outer members, said sensor assembly comprising,
   a stator assembly including a first flux guide carried by one of said members for displacement therewith,
   a rotor ring including a second flux guide carried by the other of said members for displacement therewith concentrically with said stator assembly, said first and second flux guides defining opposed pole faces defining a radial air gap therebetween,
   a magnet magnetically coupled with one of said flux guides,
   a galvanomagnetic position sensing element coupled to one of said flux guides, and
   an inductor magnetically coupled with one of said flux guides and operative to generate an output voltage signal as a direct function of the instantaneous relative speed of rotation between said stator assembly and rotor ring.

2. The assembly of claim 1, wherein the output signal from the speed sensor represents a relative speed between the members without having to differentiate the signal with respect to time.

3. The assembly of claim 2, wherein one of the members is established by said stator assembly and the other of the members is established by said rotor ring.

4. The assembly of claim 3, wherein the stator assembly includes at least first and second opposed radially tapered stator poles and the rotor assembly includes at least first and second radially inwardly extending tapered rotor poles.

5. The assembly of claim 3, wherein the stator assembly is on the first member and the first member is an inner member, the rotor being on the second member the second member surrounding the first member.

6. The assembly of claim 1, wherein the speed sensor is contactless.

7. The assembly of claim 1, wherein said air gap is established between the members which varies dimensionally as a function of the relative angular position of the members.

8. The assembly of claim 1, wherein the inductor comprises at least one coil wound around a portion of the stator assembly.

9. A speed sensing system, comprising:
   at least one bushing assembly including a moving part, a non-moving part, and at least one elastomeric material therebetween, at least one sensor assembly being disposed at least partially in the elastomeric material intermediate said parts and generating a signal representing at least one parameter selected from the group including: relative position between the parts, and relative speed between the parts; and
   means receiving the signal for outputting a speed signal representing relative speed between the parts,
   said sensor assembly comprising,
   a stator assembly including a first flux guide carried with one of said parts for displacement therewith,
   a rotor ring including a second flux guide carried with the other of said parts for displacement therewith concentrically with said stator assembly, said first and second flux guides defining opposed pole faces defining a radial air gap therebetween,
   a magnet magnetically coupled with one of said flux guides,
   a galvanomagnetic position sensing element coupled to one of said flux guides, and
   an inductor magnetically coupled with one of said flux guides and operative to generate said speed signal as a direct function of the instantaneous relative speed of rotation between said stator assembly and rotor ring.

10. The system of claim 9, wherein the sensor assembly is a speed sensor and the means for outputting does not include an electronic circuit differentiating the signal with respect to time.

11. The system of claim 10, wherein the inductor comprises at least one coil wound around a portion of said stator assembly.

12. The system of claim 9, wherein the bushing assembly is engaged with a lower control arm of a vehicle suspension, and the speed signal is used by a control system to establish a stiffness of at least one shock absorber in the vehicle.

13. The system of claim 9, wherein the moving part is said rotor ring and the non-moving part is said stator assembly surrounded by the rotor ring.

14. A bushing assembly for a vehicle, comprising:
a stator assembly engageable with a first part of a vehicle;
a rotor ring engageable with a second part of the vehicle;
a resilient material disposed between the stator assembly and rotor ring; and
at least one sensor assembly engaged with the rotor ring or the stator assembly for outputting a signal that is directly proportional to the relative speed between the parts without having to differentiate the signal with respect to time,
wherein said sensor assembly is at least partially embedded within an elastomeric member intermediate said first and second parts, said sensor assembly comprising,
said stator assembly including a first flux guide carried by one of said parts for displacement therewith,
said rotor ring including a second flux guide carried by the other of said parts for displacement therewith concentrically with said stator assembly, said first and second flux guides defining opposed pole faces defining a radial air gap therebetween,
a magnet magnetically coupled with one of said flux guides,
a galvanomagnetic position sensing element coupled to one of said flux guides, and
an inductor magnetically coupled with one of said flux guides and operative to generate said signal as a direct function of the instantaneous relative speed of rotation between said stator assembly and rotor ring.

15. The assembly of claim 14, wherein the inductor comprises at least one coil wound around a portion of the stator assembly.

16. The assembly of claim 15, comprising said magnet on the stator assembly.

17. The assembly of claim 16, wherein the stator assembly defines at least one stator pole face and the rotor ring defines at least one rotor pole face, the pole faces being configured to establish an output of the coil sensor that varies substantially linearly with the relative speed between the rotor ring and stator assembly.

18. The assembly of claim 17, further comprising a position sensor on the rotor ring or the stator assembly.

19. The assembly of claim 14, wherein the bushing assembly is engaged with a lower control arm of a vehicle suspension, and the signal is used by a control system to establish a stiffness of at least one shock absorber in the vehicle.

* * * * *